J. E. YOUNG.
Edge-Trimmers for Boots and Shoes.
No. 198,234. Patented Dec. 18, 1877.
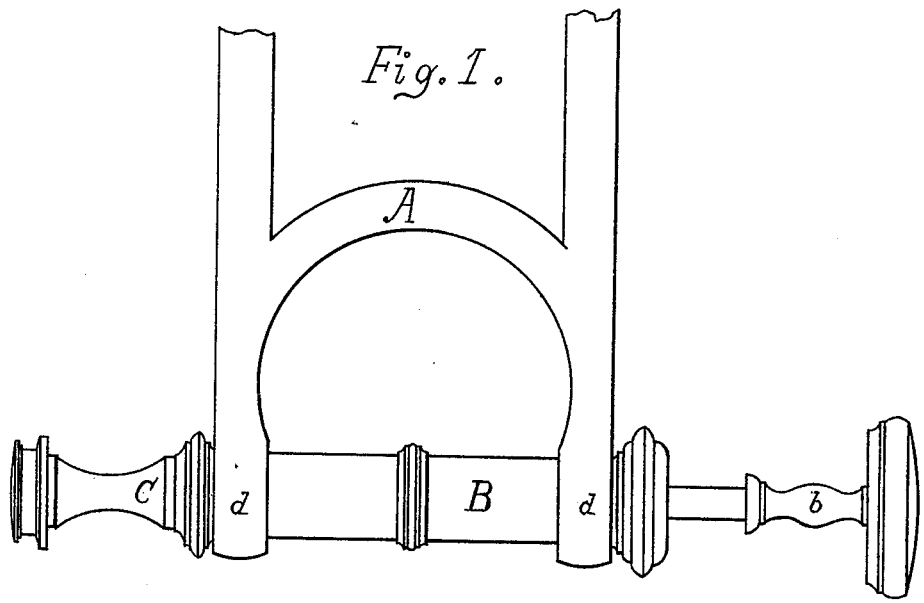
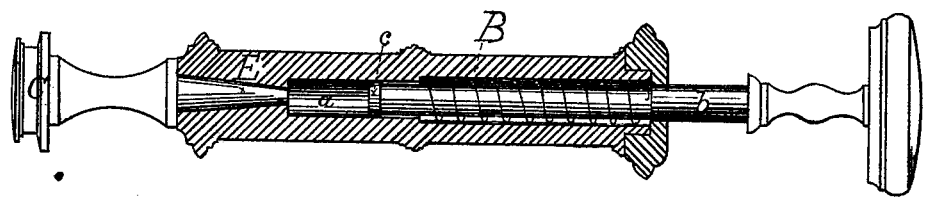
Witnesses:
M. George
D. P. Cook
Inventor:
James E. Young
by atty M. Bailey

UNITED STATES PATENT OFFICE.

JAMES E. YOUNG, OF LYNN, MASSACHUSETTS.

IMPROVEMENT IN EDGE-TRIMMERS FOR BOOTS AND SHOES.

Specification forming part of Letters Patent No. 198,234, dated December 18, 1877; application filed July 7, 1877.

*To all whom it may concern:*

Be it known that I, JAMES E. YOUNG, of Lynn, in the county of Essex and Commonwealth of Massachusetts, have invented certain Improvements in Machinery for Trimming or Setting the Edges of Boot and Shoe Soles, of which the following is a specification:

This invention relates to means for instantly and readily removing or expelling the trimming or setting tool of sole-finishing machinery while the machine is in operation, or the arbor carrying such tool is in rotation, thus avoiding the loss of time now requisite to effect the same purpose by stopping the motion of the machine or of the arbor.

The invention in question consists in forming an axial hole throughout the arbor, communicating with the tapering seat of the finishing-tool, and inserting within this bore, and from the end opposite the tool, a plunger provided with a suitable head or knob, by which it may be driven suddenly inward.

The length of the plunger may be such that when pushed inward toward the stem of the finishing-tool it shall not abut against the latter, but a space is to be left between, into which air enters and forms a cushion between the plunger and tool; or the plunger may be sufficiently long to abut, when driven inward, directly against said stem.

The drawings accompanying this specification represent, in Figure 1, a side elevation, and in Fig. 2 a longitudinal section, of the arbor and a portion of the frame of an edge trimming and setting machine embodying my present invention.

In the drawings, A represents the outer portion of the variable or swinging arm of an edge setting and trimming machine, which supports the arbor in which the finishing-tool is inserted, after the manner of turning-lathes and kindred machinery.

The arbor above named is shown at B as revolving in suitable bearings $dd$, and an edge-setting tool at C, the shank or stem of the latter being tapering, and entering a tapering seat, E, formed for its reception in the outer end of the arbor. The said arbor is tubular throughout, as shown at $a$, and into this bore I insert loosely from the rear end a cylindrical plunger, $b$, provided at its outer end with a milled head or knob, $c$.

The length of the plunger $b$, as shown in the drawings, is considerably less than the distance between the outer or rear end of the arbor of the stem of the finishing-tool; consequently a body of air remains between the adjacent ends of the tool-shank and plunger.

A sudden blow inward upon the plunger drives the interposed air-cushion against the end of the tool-spindle, and expels such tool from the arbor while the latter is in rotation.

The value of the air-cushion is, that it acts at all times equally upon the entire end surface of the tool-shank, and for this reason is certain to expel the tool when driven against. If a wire is inserted within the bore of the arbor of sufficient length to abut against the tool-spindle, it would not always abut against the center of such spindle, and might in some instances tend to cant it within its seat, and render its expulsion difficult. My invention, however, is not limited to this air-space, but may embrace both methods.

I claim—

In combination, the arbor B, tool C, and plunger $b$, under the arrangement and operating substantially as and for purposes stated.

JAMES E. YOUNG.

Witnesses:
 F. CURTIS,
 W. E. BOARDMAN.